(12) United States Patent
Westphal et al.

(10) Patent No.: US 7,037,539 B2
(45) Date of Patent: May 2, 2006

(54) NUTRITIOUS STRAWBERRY FRUIT JUICE DRINK AND METHOD OF MAKING THE SAME

(75) Inventors: Kathleen A. Westphal, Richland, WA (US); Peter H. Mattson, Foster City, CA (US); Rita M. Casteel, Hughson, CA (US)

(73) Assignee: California Giant, Inc., Watsonville, CA (US)

( * ) Notice: Subject to any disclaimer, the term of this patent is extended or adjusted under 35 U.S.C. 154(b) by 39 days.

(21) Appl. No.: 10/883,553

(22) Filed: Jul. 1, 2004

(65) Prior Publication Data
US 2005/0008734 A1 Jan. 13, 2005

Related U.S. Application Data

(60) Provisional application No. 60/484,847, filed on Jul. 3, 2003, provisional application No. 60/549,340, filed on Feb. 27, 2004.

(51) Int. Cl.
*A23B 7/155* (2006.01)
*A23L 2/02* (2006.01)

(52) U.S. Cl. .................. 426/51; 426/52; 426/599
(58) Field of Classification Search ........... 426/50, 426/51, 52, 61, 599
See application file for complete search history.

(56) References Cited

U.S. PATENT DOCUMENTS

| | | | | |
|---|---|---|---|---|
| 4,211,799 | A | * | 7/1980 | Grampp et al. ............ 426/50 |
| 4,551,341 | A | * | 11/1985 | Blanie et al. ............ 426/489 |
| 4,971,811 | A | * | 11/1990 | Strobel et al. ............ 426/50 |
| H859 | H | * | 12/1990 | Augustine ................ 426/599 |
| 5,077,075 | A | * | 12/1991 | Wade ..................... 426/564 |
| 5,089,285 | A | * | 2/1992 | Nozaki et al. ............ 426/573 |
| 6,030,648 | A | * | 2/2000 | Heldt-Hansen et al. ..... 426/49 |
| 6,106,874 | A | * | 8/2000 | Liebrecht et al. ......... 426/74 |
| 6,286,407 | B1 | * | 9/2001 | Ortega et al. ............ 83/857 |
| 6,479,092 | B1 | * | 11/2002 | Wettlaufer ............... 426/639 |
| 6,528,085 | B1 | * | 3/2003 | Madsen et al. ........... 424/439 |
| 6,589,581 | B1 | * | 7/2003 | Marks et al. ............ 426/324 |

FOREIGN PATENT DOCUMENTS

| | | | |
|---|---|---|---|
| JP | 51-001674 | * | 1/1976 |
| JP | 56-045178 | * | 4/1981 |
| JP | 61-247361 | * | 11/1986 |
| JP | 06-169736 | * | 6/1994 |
| WO | 2004/084652 A1 | * | 10/2004 |

OTHER PUBLICATIONS

Principles and practices of small- and medium-scale fruit juice processing. Chapter 14: "Berries". p. 171-176. ISBN # 9251046611. Published 2001.*
"S.J. takes on O.J.: Grower blazes strawberry juice trail." Agcongay, J. Jun. 6, 2004 Santa Cruz Sentinel. http://www.santacruzsentinel.com/archive/2004/June/06/biz/stories/01biz.htm.*
"Just Strawberries" Juice drink advertisement. www.calgiant.com (2005).*
FAO/WHO Food Standards, Codex alimentarius. "Codex standard for canned strawberries." Codex Stan 62-1981. 6 pages. (2005).*
Strawberry Juice Concentrate. Oriental (Zhangzhou) & Co., Ltd. (2005) http://orientfoods.en.alibaba.com/product/50028739/50133891/Juice_Puree_Concentrates/Strawberry_Juice_Concentrate.html.*
"Strawberry Syrup" and "Strawberry, Apple and Grape Nectar". Product information. www.fructal.si, date N/A.*
"Viscosity of concentrated strawberry juice. Effect of temperature and soluble solids content." Electronic Journal of Polish Agricultural Universities. vol. 6, No. 2. (2003) www.ejpau.media.pl/series/volume6/issue2/food/art-11.html.*

* cited by examiner

*Primary Examiner*—Keith Hendricks
(74) *Attorney, Agent, or Firm*—Bruce H. Johnsonbaugh

(57) ABSTRACT

A strawberry juice drink is described along with a method of producing the drink. The drink is made solely from strawberries without being blended with other fruit or fruit flavorings. A blend of strawberries having a Brix reading above 6.5° is pureed and filtered and/or centrifuged to remove seeds and large pulp solids. An enzyme is added to the pureed juice stock to reduce fiber length. Water is added to form a mixture of between 25% and 45% water and between 55% and 75% pureed juice stock by volume. A hydrocolloid gum, ascorbic acid and a low calorie sweetener, preferably sucralose, are added to the mixture. The resulting juice brink is nutritious, refreshing and has less than half the calories of orange juice.

18 Claims, 2 Drawing Sheets

NUTRITIOUS STRAWBERRY FRUIT JUICE DRINK AND METHOD OF MAKING THE SAME

CROSS-REFERENCE TO RELATED APPLICATIONS

This application claims the benefit of and priority from U.S. provisional applications Ser. No. 60/484,847 filed Jul. 3, 2003 and Ser. No. 60/549,340 filed Feb. 27, 2004.

BACKGROUND AND BRIEF SUMMARY OF INVENTION

This invention relates to the creation of a nutritious fruit juice drink made only of strawberries, but having the general pulpy texture of orange juice. The new drink is lower in calories and lower in carbohydrates than orange juice, yet still retains all of the nutritive and flavor characteristics of strawberries.

Although strawberry is among the most popular and most widely used flavors for beverages and food, there is no highly nutritious fruit juice which is made up entirely of strawberries. It is very common to use strawberry flavor in conjunction with other flavors to produce fruit juices, both clear and full-bodied with pulp, shelf stable and fresh refrigerated. Strawberry is very popular as a component of the "healthy" category of premium juice blends now on the market.

There are a few strawberry juice drinks in the marketplace but they are generally highly sugared and with a relatively low percentage of real strawberry juice. These drinks are syrupy, too sweet to be called refreshing, and are high in calories and carbohydrates. These drinks are generally in the "nectar" category.

Orange juice is far and away the most widely consumed fruit juice in the U.S. It is refreshing, nutritious, has "body" in the form of pulp and has a sweet appealing taste. Orange juice measures typically between 11°–12° Brix without enhancement. The natural sweetness of orange juice is clearly an important factor in its popularity. On the other hand, the natural sweetness of orange juice carries with it a high sugar content that in turn means relatively high calories and high carbohydrates.

The present invention provides for the first time a nutritious, full bodied, refreshing and pleasant tasting strawberry juice product wherein the strawberry juice is not blended with other flavors such as banana, mango, kiwi or a variety of other flavors which have heretofore been blended with strawberry. For the first time, a strawberry juice product will be available in the refrigerated section of markets wherein the taste is pure strawberry. The product will be cost competitive with premium fruit juices, as nutritious as orange juice, while having less than half the calories and carbohydrates of orange juice.

The purpose of the present invention is to produce a nutritious strawberry juice drink having a sufficiently sweet and refreshing taste to compete with orange juice as a breakfast drink. Approximately three billion dollars of orange juice is consumed by U.S. citizens annually. Another significant fact is that U.S. citizens annually consume more fruit juice than they do fresh fruit (excluding bananas), but that strawberries, which are among the most popular fruits, have never been juiced in commercial marketable quantities. The present invention provides for the first time a strawberry juice drink having a taste approximately as sweet as orange juice and being equally refreshing as orange juice, but with 60% less calories and carbohydrates.

Strawberries have inherent characteristics which complicate the production of a drink made solely from them. Although strawberries rank high in nutritional content, fresh strawberries that are simply pureed in a blender produce a puree that is too viscous, too tart and not sweet enough to the average taste. Whereas fresh squeezed orange juice would typically render a Brix level of 11.5°, straight strawberry puree would have a Brix level range of only 7° to 9°, would be very tart, and would be much too thick to drink. The strawberry puree also contains considerable undesirable elements such as seeds and other fibers which do not contribute favorably to the taste. Additionally, the cost of a strawberry puree is significantly more expensive than fresh squeezed orange juice.

The present invention achieves a strawberry juice drink that has appropriate viscosity, sweetness, nutrition and a sufficiently refreshingly taste to compete directly with orange juice as a breakfast beverage. The present invention is competitive costwise with premium fruit juices.

A primary object of this invention is to create a juice drink using only strawberries as a base while maximizing the nutritive value and minimizing the calories and carbohydrates.

A further object is to create a competitive juice drink for the breakfast juice market, which is presently thoroughly dominated by orange juice.

Another object is to create a method for making a strawberry based juice drink which results in a pleasant tasting, satisfying, refreshing, nutritious and low calorie drink.

Other objects and advantages will become apparent from the following description and drawings wherein:

DETAILED DESCRIPTION OF INVENTION AND DRAWINGS

Figure 1:
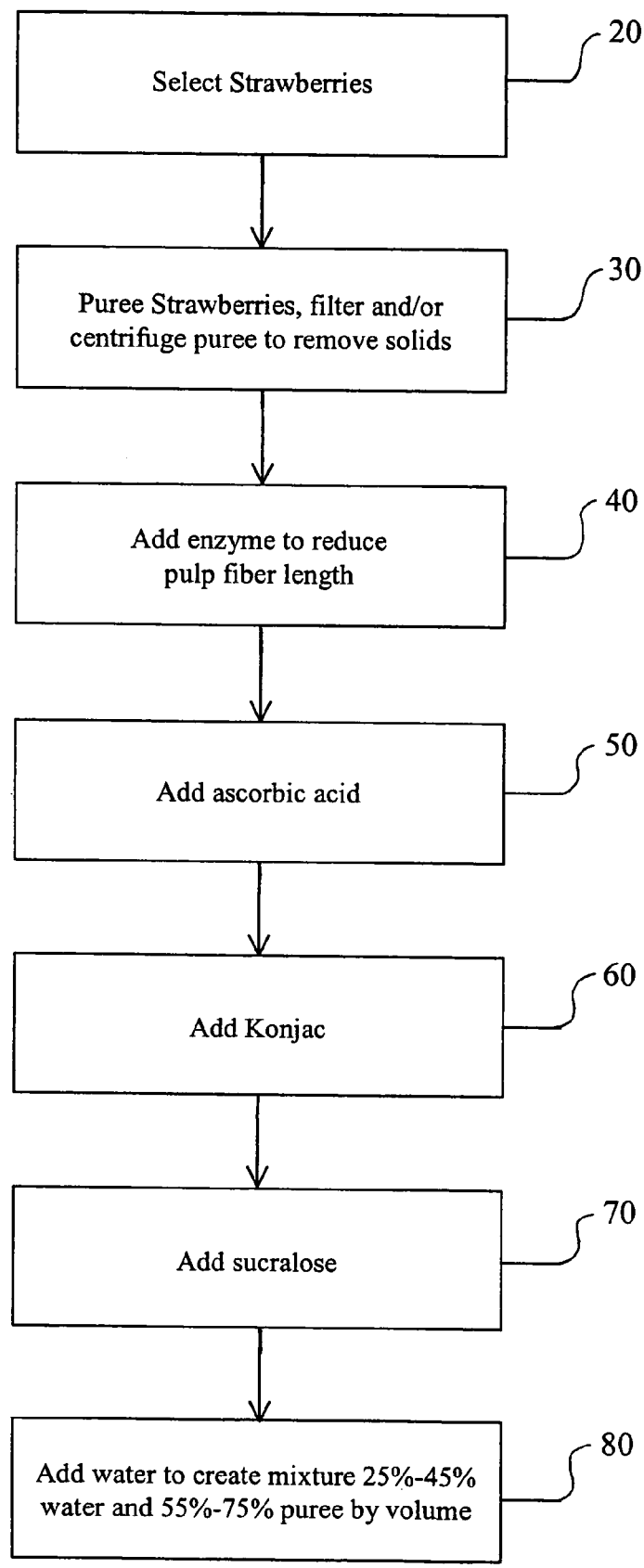
FIG. 1 is a flowchart illustrating the steps of the preferred embodiment of the invention.

The method of the invention will be described as a sequence of steps. However, it must be understood that the sequence of steps may change depending on the equipment being used. Some ingredients may be added earlier or later in the process as described below. Similarly, the individual ingredients may be added in two or more steps. These variations are utilized to achieve the most thorough mixing possible, and are variables known to persons skilled in this art. Those variables are not recited herein in the interest of brevity.

The first step in the preferred method of preparing the strawberry juice drink is selecting Juice Stock as a starting material. Generally, fresh or frozen Juice Stock is selected that, when blended, will produce a blend with Brix above 6.5°, a color between Pantone Q170-1-2-Q 140-2-3 (coated chips: 185C and 187C), and a fresh strawberry flavor with no fermented, green, or moldy notes, and acceptable scores on tests for yeast, mold and pathogens.

The Juice Stock grade of strawberries is made up of whole strawberries with calyx and sepal still in place. These are generally strawberries that are culled from a harvest of fresh strawberries, although Juice Stock might be picked during times of poor markets or after rain. Most of the fruit is blemished in some way; misshapen, split, creased, bronzed or rain damaged. Some of the fruit may be green and some may just be too small to harvest as fresh. The green content is greatly elevated when fruit must be stripped after a rain.

There is a preference for this invention for fruit which is culled out during a normal fresh harvest as it will tend to be of better color and higher Brix content. Overall, the higher the Brix content, the higher the ultimate yield will be. Too much green fruit degrades the color, which is important. It is best if a comment about flavor is recorded when the Juice Stock is packed as even fruit that has good color and high Brix can sometimes not carry strong strawberry flavor.

There are many varieties of strawberries. These varieties tend to change over time. There are different skin colors, ranging from deep red to orange, and different flesh colors as well, from deep red all the way to mostly white interior flesh. Generally, strawberries can be highly flavored and sweet despite these differences in color.

For Juice Stock to be used in the fruit juice drink, it must be scored when it is originally packed for color, Brix, variety, pH and Howard Mold count, and scores recorded. When packed, Juice Stock is generally segregated into "lots" that are packed on the same day and have similar scoring characteristics.

Juice Stock is delivered from the field the same day it is picked and is either run (processed as described below) or cooled that day for later processing. It is run through a sanitizing wash, usually some form of chlorine, and sorted for rot, decay, and foreign objects before it is packed in 400 lb drums for frozen storage. It can be sliced or whole but sliced is preferred for this invention. If the Juice Stock is not processed immediately, it is frozen.

FIG. 1 is a flowchart illustrating the key steps of the process. The first key step is shown as 20, selecting strawberries.

The next step (optional) in the process is blending Juice Stock portions that, when blended, will form optimized Juice Base. For example, one Juice Stock portion at the dark end of the acceptable color range would preferably be blended with a second Juice Stock portion at the light end of the acceptable color range. Frozen Juice Stock must be at least partially thawed in order to be blended. This step may optionally be omitted, provided the Juice Stock is acceptable.

The next step is freezing either the acceptable Juice Stock or blended Juice Base for two weeks or more to arrest yeast and mold levels. The frozen acceptable Juice Stock or blended Juice Base will be referred to as Juice Base.

The Juice Base is then thawed to a workable degree below 40° F. and is sampled and measured for Brix, pH, color and Howard Mold, and the scores recorded.

The Juice Base is next transferred into a holding tank and in the next step is heated to between 60° F. and 85° F.

The next key step 30 is the Juice Base is then filtered and/or centrifuged to remove solids. It is first pureed through a 0.045 inch finishing or filtering screen. The pureed Juice Base is then again pureed through an 0.027 inch finishing or filtering screen. The filtering step of using a 0.027 inch finishing screen removes objectionably large solids such as seeds and large pulp fibers. The next step is removing any remaining seeds by centrifuging the pureed and filtered Juice Base. The next step is to treat the resultant puree with a Comitrol machine, which will pulverize any remaining seed or large pulp.

The Juice Base is then optionally transferred to a vacuum tank wherein vacuum is applied to remove excess air.

The next key step 40 is to treat the puree with a specialty enzyme preparation which contains mainly the specific pectin-transeliminase or endo pectin lyase activity. The pectin degradation occurs by transeliminative pattern without previous deesterification. The preferred enzyme is ROHAPECT® PTE obtained from AB Enzymes GmbH. The applicants believe that this style of enzyme has never before been used on strawberries for this purpose.

The next key step 50 is that ascorbic acid is added to increase Vitamin C and to stabilize the color in the Juice Base.

The Juice Base is then cooled to 45° F. to stop enzymatic reaction. Insoluble solids, Brix, % TA (total acidity), and pH are measured and recorded. A sample is taken to measure micro-organisms. The Juice Base is then transferred to 55 gal. drums (400 lb) or other suitable conveyance and frozen immediately unless the Juice Base is to be shipped immediately for juice manufacture. If the Juice Base is not to be frozen, it must be refrigerated sufficiently before shipment to bring the temperature below 40° F. The Juice Base is then thawed to iceless or nearly iceless without raising the temperature above 40° F. The Juice Base is then sampled for % TA, ascorbic acid (Vitamin C) and pH, and scores recorded. Samples for micro-organism control are taken and retained.

The next key step 60 is to add Konjac or other hydrocolloid gum at approximately 0.01% by weight of the mixture. Sucralose is preferably added in step 70 in the proportion of 0.032% plus or minus 0.01% by weight, but sucralose may be added in the proportion of between 0.022% and 0.042% by weight of the total mixture. Ascorbic acid is added at 0.02%–0.04% by weight predicated on the above said tests for Brix, ascorbic acid and % TA. Konjac Flour is a hydrocolloid that retains a high degree of moisture, is heat stable, gelatin and gluten free and is high in fiber, low in calories, and has very little taste. The fine pulp that remains in the Juice Base tends to settle very quickly. Konjac is the best agent available to hold solution longer and improve mouth feel without affecting the flavor profile. Sucralose is a no calorie sweetener made from sugar. It requires no warning label, is safe for virtually all consumers including diabetics and pregnant and nursing women. The effect of sucralose cannot be measured as Brix by a refractometer. Due to the decline of ascorbic acid over time, the Juice Base must be tested and ascorbic acid added to restabilize at the correct level. The Konjac, sucralose (or other low calorie sweetener) and ascorbic acid are added with water to the blending tank.

The Juice Base is transferred by pumping or otherwise to a blending tank, and the next key step 80 is to add sufficient water to reduce the Brix reading of the mixture to between 5° and 5.2°. The acceptable range of water added is 25% to 45% by volume (of the total mixture). The acceptable range of puree in the mixture is 55% to 75% by volume. Water may alternately be added earlier in the process, either in a single step or in two or more steps, provided that the total water added results in a mixture having 25% to 45% water by volume.

FIG. 1 illustrates the key or required steps of the preferred process, but FIG. 1 does not limit the sequencing of the various steps.

Figure 2:
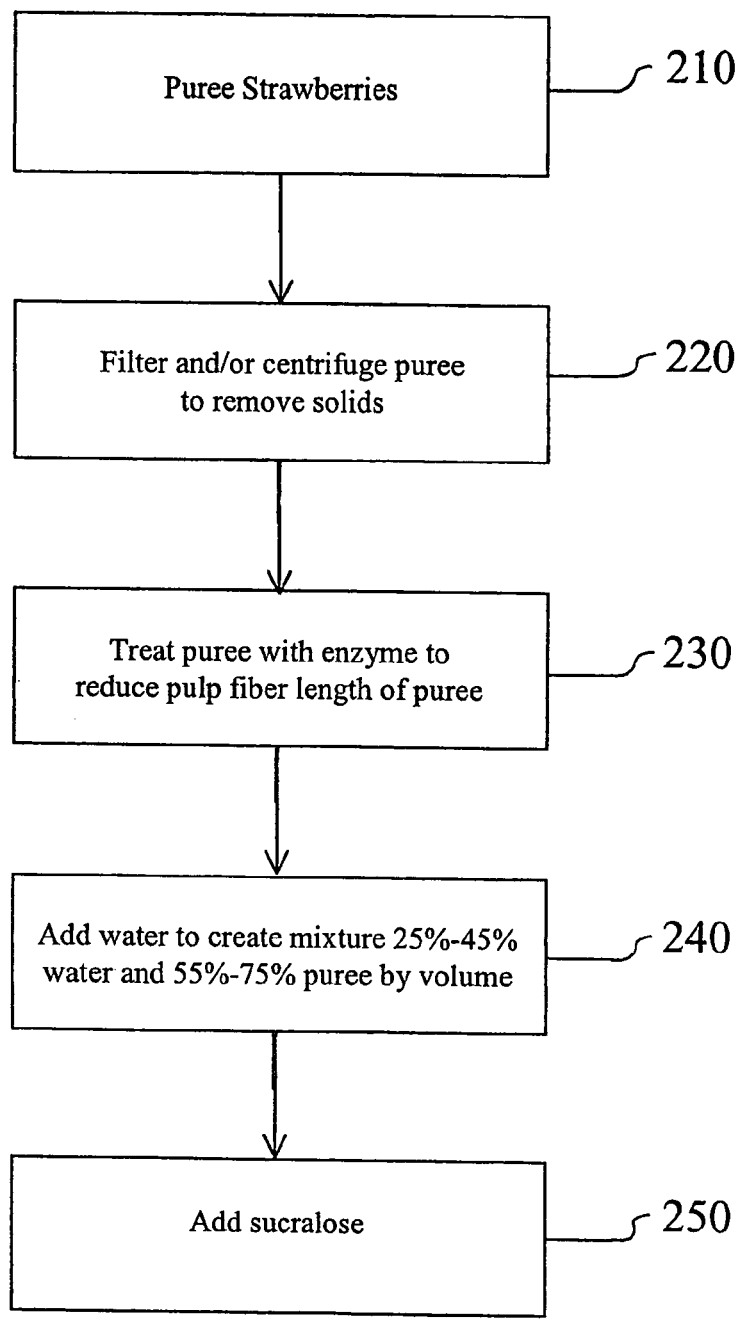
FIG. 2 is a flowchart illustrating the steps of an alternate embodiment of the invention.

FIG. 2 illustrates another, less preferred, embodiment of the invention. The first step 210 is to puree either fresh or previously frozen strawberries. The second step 220 is to filter and/or centrifuge the puree to remove a selected size range of solids. The third step 230 is to treat the puree with any acceptable enzyme which reduces the pulp fiber length.

The fourth step 240 is to add sufficient water to form a resultant mixture of water and puree having between 25%–45% water and 55%–75% puree by volume. The fifth step 250 is to add sucralose to bring the perceived sweetness to an equivalent Brix reading of the mixture to between 10° and 13°. This is accomplished by adding between 0.022% and 0.042% sucralose by weight of the mixture.

The juice product described above has the following microbiology and chemical specification:

| Parameters | Target Specifications |
| --- | --- |
| MICROBIOLOGY: | |
| Total Plate Count | Less than 1000/g |
| Coliform | Less than 3/g |
| Yeast and Mold | Less than 10/g |
| Lactobacillus | Less than 500/g |
| Howard Mold Count | Less than 18% |
| CHEMICAL: | |
| pH | 3.5 +/− 0.3 |
| % Titratable Acidity, as citric | 0.55 +/− 0.10 |

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A method of producing a strawberry juice drink, comprising the steps: selecting strawberries for juice stock to create a blend having a Brix reading above 6.5°
    pureeing said juice stock and filtering and/or centrifuging said juice stock one or more times to remove seeds and large pulp solids,
    adding an enzyme to said pureed juice stock to reduce fiber length,
    adding ascorbic acid,
    adding a hydrocolloid gum,
    adding a low calorie sweetener, and
    adding sufficient water to said pureed juice stock to form a mixture of between 25% and 45% water and between 55% and 75% pureed juice stock by volume,
    wherein strawberries are the sole source of juice or fruit flavor.

2. The method of claim 1 comprising the further step before pureeing said juice stock of heating said juice stock to 60° to 85° F.

3. The method of claim 1 wherein said enzyme contains mainly specific pectin-transeliminase or endo pectin lyase activity and wherein pectin degradation occurs by transeliminative pattern without previous deesterification.

4. The method of claim 1 wherein said enzyme is Rohapect® PTE.

5. The method of claim 1 wherein said pureed juice stock is filtered twice, once through a 0.045 inch screen and then a second time through a 0.027 inch screen.

6. The method of claim 5 wherein said juice stock is centrifuged after being filtered twice.

7. The method of claim 6 wherein after being centrifuged, said juice stock is treated with a Comitrol machine to pulverize remaining seeds or large pulp.

8. The method of claim 1 wherein said hydrocolloid gum is konjac.

9. The method of claim 1 wherein said low calorie sweetener is sucralose.

10. The method of claim 9 wherein the sucralose added is between 0.022% and 0.042% by weight of said mixture.

11. The method of claim 1 wherein the selected strawberries have a color that, when blended, will have a color between Pantone Q170-1-2 and Q140-2-3.

12. A method of making a strawberry juice drink, wherein freshly harvested or frozen strawberries are utilized as the starting material, comprising the steps:
    pureeing said strawberries,
    filtering and/or centrifuging said pureed strawberries to remove solids,
    treating the pureed strawberries with an enzyme to reduce fiber length,
    adding water to said pureed strawberries to form a mixture having 25% to 45% water and 55% to 75% strawberry puree by volume,
    adding a low calorie sweetener to said mixture,
    and adding a hydrocolloid gum,
    wherein strawberries are the sole source of juice or fruit flavor.

13. The method of claim 12 wherein said enzyme is Rohapect® PTE.

14. The method of claim 12 wherein said low calorie sweetener is sucralose.

15. A strawberry juice drink, made by the process comprising the following steps:
    selecting strawberries for juice stock having a Brix reading above 6.5°,
    pureeing said juice stock and filtering and/or centrifuging said juice stock one or more times to remove seeds and large pulp solids,
    adding an enzyme to said pureed juice stock to reduce fiber length,
    adding sufficient water to said pureed juice stock to form a mixture of between 25% and 45% water and between 55% and 75% pureed juice stock by volume,
    adding konjac to said mixture,
    adding ascorbic acid to said mixture,
    and adding between 0.022% and 0.042% sucralose by weight to said mixture,
    wherein strawberries are the sole source of juice or fruit flavor.

16. The strawberry juice drink made by the process of claim 15 wherein said enzyme is Rohapect® PTE.

17. A strawberry juice drink, made from fresh or frozen strawberries by the process comprising the steps:
    pureeing said strawberries,
    filtering and/or centrifuging said pureed strawberries to remove solids,
    treating the pureed strawberries with an enzyme to reduce fiber length,
    adding water to said pureed strawberries to form a mixture having 25% to 45% water and 55% to 75% strawberry puree by volume,
    adding sucralose to said mixture,
    and adding a hydrocolloid gum
    wherein strawberries are the sole source of juice or fruit flavor.

18. A strawberry juice drink, comprising a mixture of:
pureed fresh or frozen strawberries having a Brix level of above 6.5° from which seeds and large pulp solids have been removed, said puree constituting between 55% and 75% of said mixture by volume, Rohapect® PTE enzyme,
water, constituting between 25% and 45% of said mixture by volume,
sucralose, constituting between 0.022% and 0.042% of said mixture by weight,
and a hydrocolloid gum,
wherein strawberries are the sole source of juice or fruit flavor.

* * * * *